(No Model.) 2 Sheets—Sheet 1.
E. W. WICKEY.
BLOCK DROPPER FOR BALING PRESSES.
No. 475,837. Patented May 31, 1892.
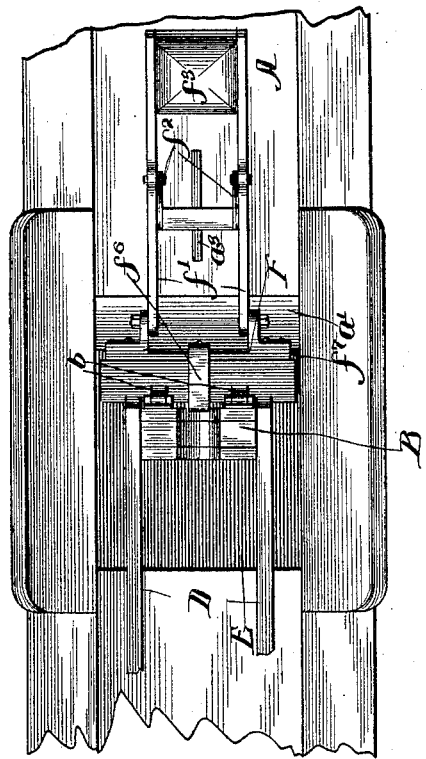
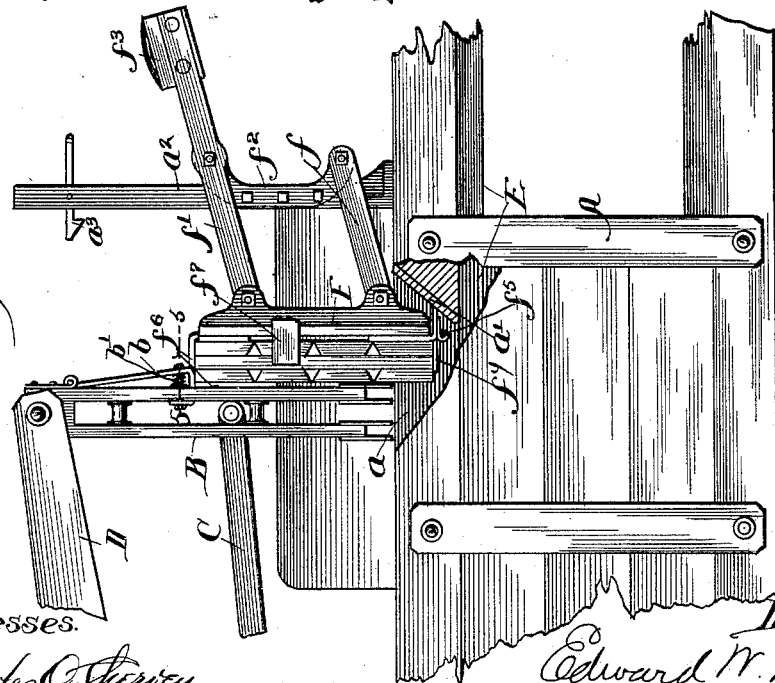
Witnesses.
Charles C. Hervey.
A. Johnson.
Inventor:
Edward W. Wickey
By Niles, Brume & Bitner
Attys.

(No Model.) 2 Sheets—Sheet 2.
E. W. WICKEY.
BLOCK DROPPER FOR BALING PRESSES.
No. 475,837. Patented May 31, 1892.
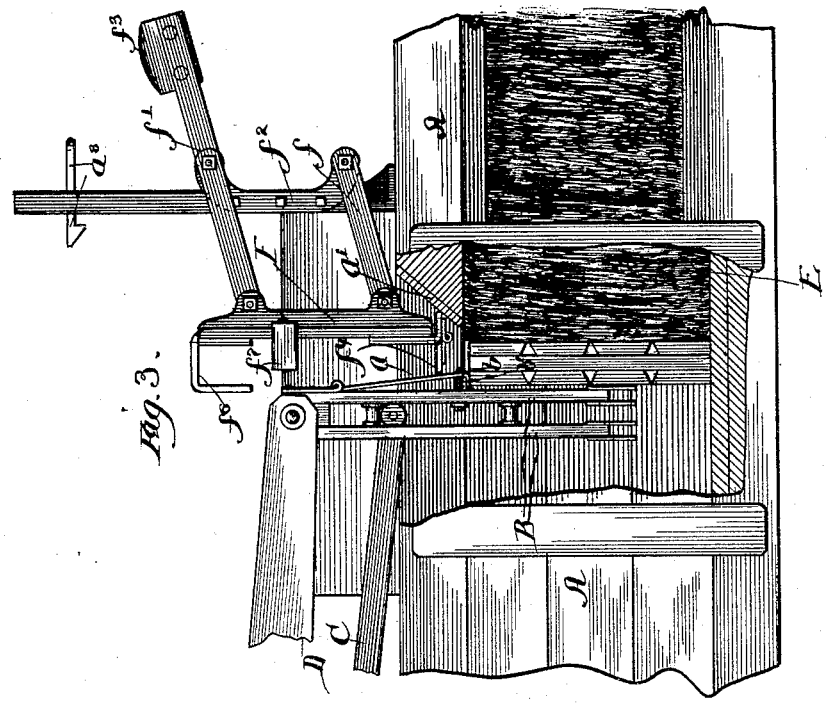
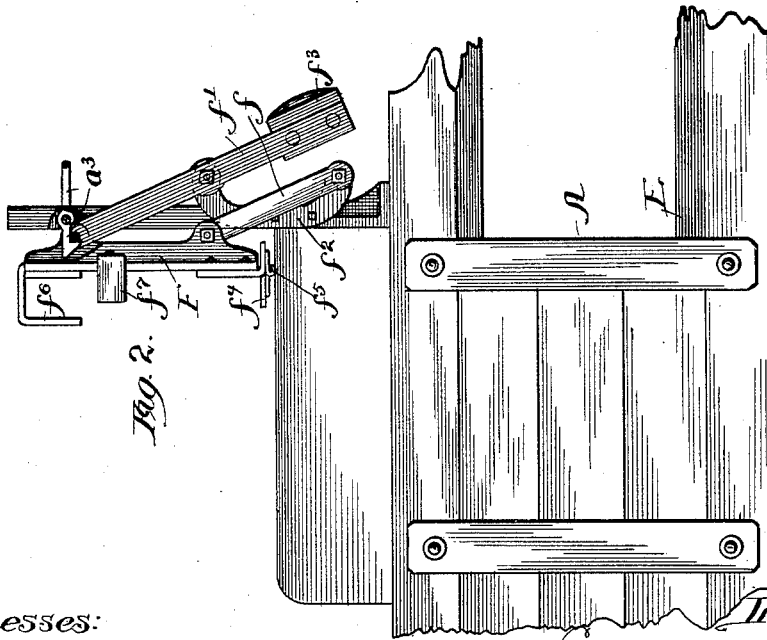
Witnesses:
Charles O. Shervey.
A. Johnson
Inventor:
Edward W. Wickey
By Willis, Morris & Pitner
Attys.

UNITED STATES PATENT OFFICE.

EDWARD W. WICKEY, OF CHICAGO, ILLINOIS.

BLOCK-DROPPER FOR BALING-PRESSES.

SPECIFICATION forming part of Letters Patent No. 475,837, dated May 31, 1892.

Application filed October 1, 1891. Serial No. 407,370. (No model.)

*To all whom it may concern:*

Be it known that I, EDWARD W. WICKEY, a citizen of the United States of America, residing at Chicago, in the county of Cook and State of Illinois, have invented certain new and useful Improvements in Block-Droppers for Baling-Presses, of which the following is a specification.

In the class of baling-presses which are commonly known as "perpetual," and in which the hay is forced into a bale chamber open at both ends and bale after bale formed and ejected from the discharge end by the advance of the bale in process of formation, it is a matter of some considerable difficulty and requiring no mean degree of skill to insert the division-blocks which are universally employed in such presses and by means of which the different bales are separated and the tying of the same made possible in such a manner that the block may be properly applied, so as to be in no danger of destruction from the advance of the plunger at the next stroke.

It is the purpose of my invention to provide a baling-press with an automatic device for inserting the division-block which shall force the same into place at the proper time and which shall be certain and accurate in its operation, the objects to be attained being, first, to dispense with the skilled labor necessary in adjusting the blocks by hand, and, second, to avoid such accidents as are inevitable even with the most careful and experienced handwork.

The preferred form in which I have embodied my invention is illustrated in the drawings by means of six figures, of which—

Figures 1, 2, and 3 are side views of a portion of a baling-press sufficient to illustrate the application of my invention and showing the device in different positions. Fig. 4 is a top view of the device as seen in Fig. 1. Fig. 5 is a section in line 5 5 of Fig. 1, and Fig. 6 is a detail view.

Hay-presses of almost all kinds are now generally provided with a vertically-reciprocating feeder, which crowds the hay as it is thrown into the hopper down into the compression-chamber, where it will be caught by the plunger and forced into the bale-chamber. I prefer to make use of this feeder as a block-inserter; but of course my invention is not limited to the use of the same, as a separate vertically-reciprocating device could easily be attached to any baling-press and operated by the same means as the feeder.

In the drawings, A represents the frame of the press; B, the feeder carried by the arms C D, which are ordinarily pivoted to the frame and oscillated by the mechanism which drives the plunger, and E is the bale-chamber, the sides of which and most of the remainder are broken away in the figures shown.

$a$ is the feed-opening in the top of the baling-press, and $a'$ a steel plate, which protects the forward end of the opening. Upon the top of the frame near the latter I have applied a standard $a^2$, upon which two oscillating arms $f$ $f'$ are pivoted, preferably by means of a plate $f^2$, curved forward at its ends, and upon the rearwardly-extending portions of the arms a carrier F is pivoted. This carrier is balanced by a weight $f^3$ upon the forward end of the arm $f'$, the gravity of which is sufficient to overcome that of the carrier and swing it upward against the standard $a^2$, and a gravity-catch $a^3$ is applied to the standard to hold the carrier in its raised position. This catch is preferably made substantially as shown, but can of course be modified in a great many ways—as, for instance, it might be applied to the carrier instead of to the standard—or, indeed, it might be replaced by pivoting the arms $f'$ $f$ in such a manner that in swinging upward they would throw the weight of both the carrier and the balancing-weight upon the forward side of pivots, and hence hold the carrier in its raised position by its own gravity. This arrangement is to enable the block to be placed in the carrier and held there until the operator or, if preferred, an automatic device operated by the motion of the hay through the press shall trip the catch, whatever it may be, and allow the carrier to move downward and forward in order to present the block in position for insertion. To receive the block, the carrier has upon the bottom a stout plate $f^4$, sustained by a spring-hinge $f^5$, and at the top an overhanging bracket $f^6$, preferably of spring-steel, adapted to press the block down upon the plate and prevent it from rattling out of place. As it is designed to slide the block in from the side, a stop $f^7$ is provided to check the block when in its proper position.

Fig. 2 shows the carrier in its position for receiving the block. When it is released or thrown forward by any means, it takes the position seen in Fig. 3. The feeder B is provided upon its front face with projections $b$, preferably two or more, large enough to catch the block in this position as the feeder makes the downward stroke and force it into the bale-chamber. As the block is forced downward the spring $f^5$ yields to allow the plate $f^4$ to swing downward out of the way, and as the block slides by the spring-pressure of the plate holds it firmly against the face of the feeder. The projections $b$ are preferably made so that they can yield upon the upstroke, so that if by any chance the block should be thrown forward when the feeder is in the compression-chamber or against it as it is withdrawn no harm will be done. The best means I have devised for allowing it to thus yield consists in the use of steel straps attached near the top of the feeder and extending down therefrom with a gradual forward incline until they reach the proper point and there pressing them forward by means of coiled springs $b'$. If preferred, however, the coiled springs may be omitted and the straps $b$ made of spring metal, so as to operate as the ordinary gate-latch in common use.

I claim as new and desire to secure by Letters Patent—

1. In a baling-press, a block-inserting device provided with suitable connections, with the driving mechanism for operating it, a block-carrier provided with means for normally holding it and the block out of the reach of the inserting device, and a tripping device, the operation of which advances the carrier and block in position for the inserter to force the latter into place, substantially as described.

2. In a baling-press having a vertically-reciprocating feeder, a pivoted block-carrier provided with means for normally holding it out of the way, a tripping device, the operation of which swings the carrier over the feed-opening, and a projection upon the feeder, adapted to engage with the block in the latter position of the carrier and force it into the press, substantially as described.

3. In a baling-press, a vertically-reciprocating feeder B, having a projection $b$, a balanced carrier F, pivoted so that it may swing into one position where it will be out of the way and into another where it will present the block in the way of the projection $b$, and a stop $a^3$, adapted to retain the carrier in the first position, substantially as described.

EDWARD W. WICKEY.

Witnesses:
C. P. SMITH,
CHARLES O. SHERVEY.